Nov. 12, 1940.  R. N. SEARS  2,221,268
AUTOMOTIVE VEHICLE SEAT
Filed Oct. 15, 1938  2 Sheets-Sheet 1
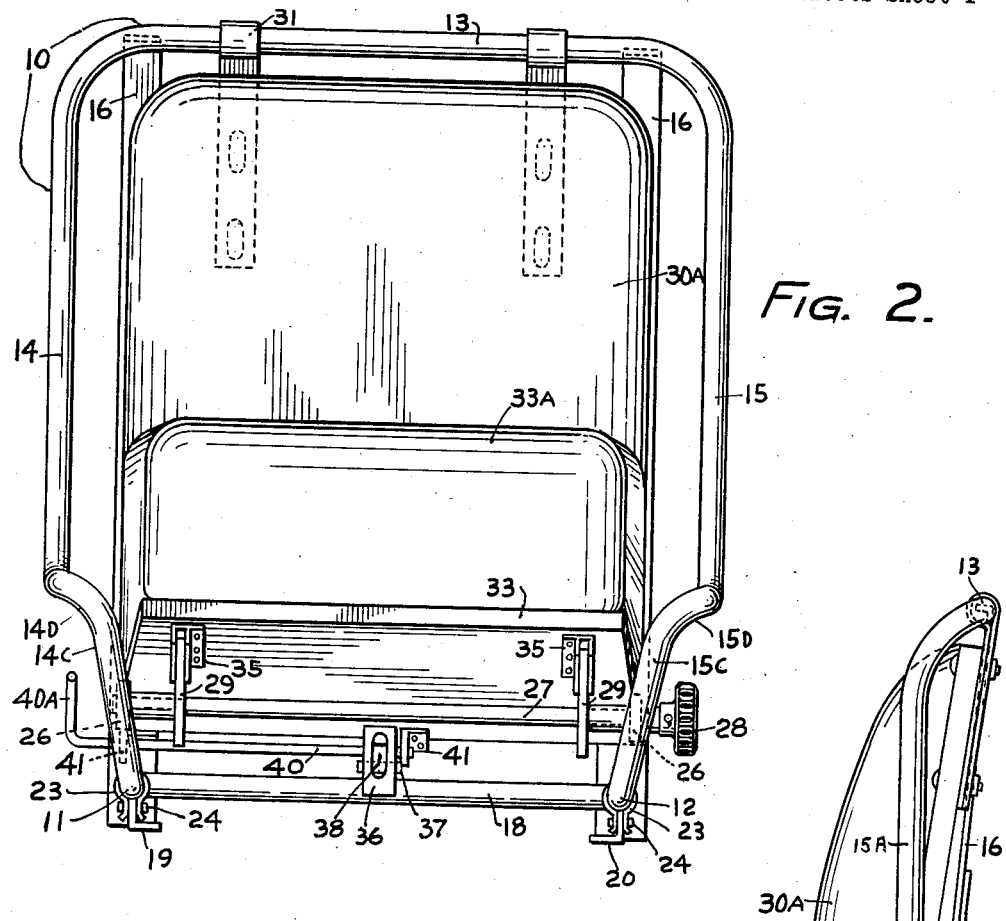
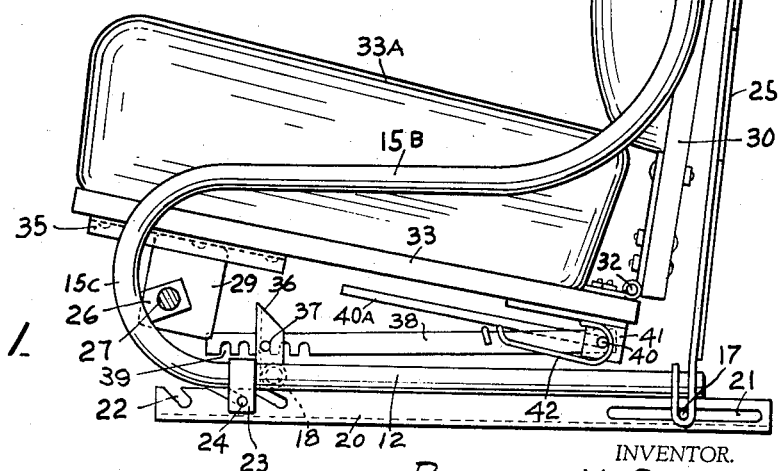
INVENTOR.
RUSSELL N. SEARS
BY Louis Seemer
ATTORNEY.

Nov. 12, 1940.  R. N. SEARS  2,221,268
AUTOMOTIVE VEHICLE SEAT
Filed Oct. 15, 1938  2 Sheets-Sheet 2
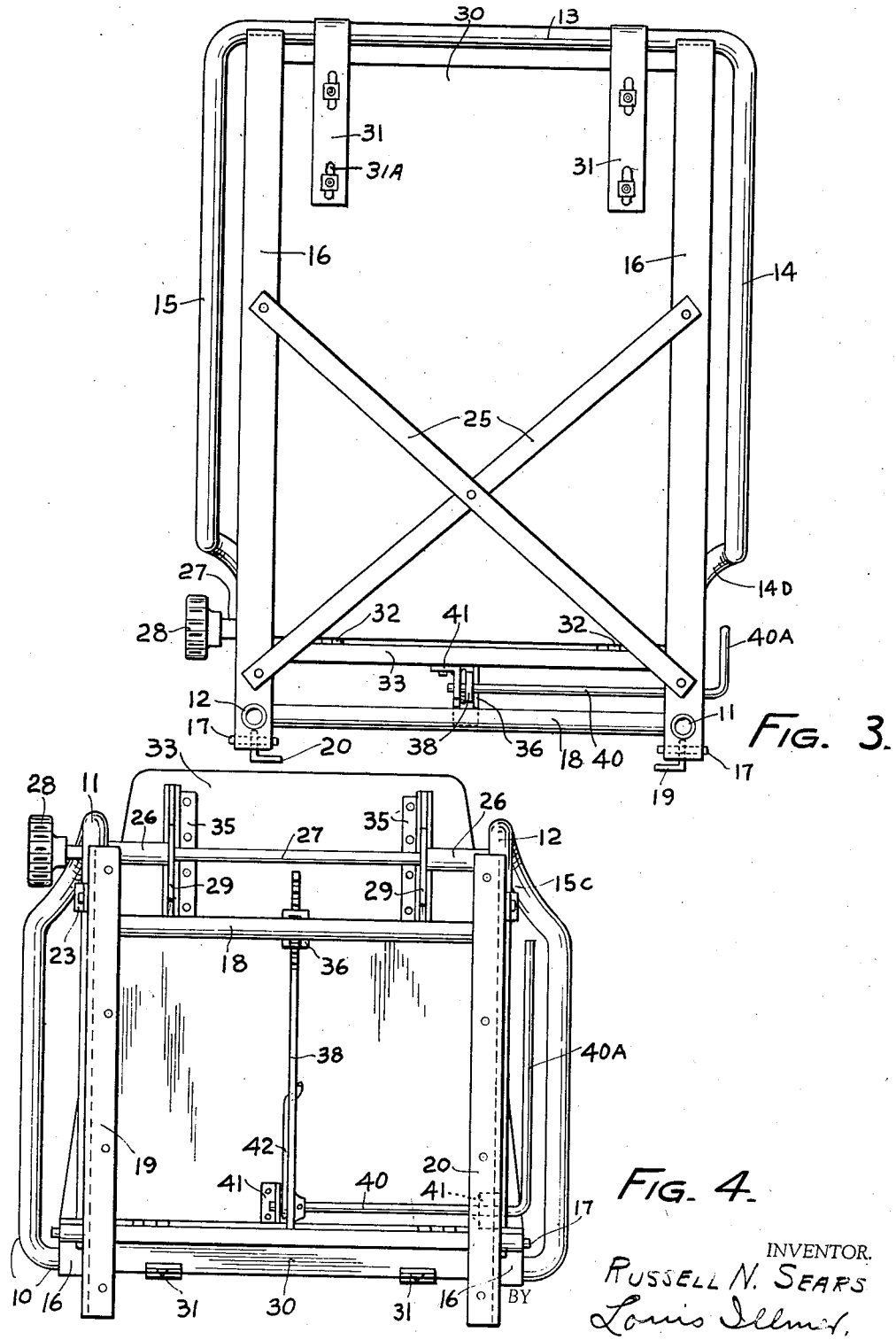
INVENTOR.
RUSSELL N. SEARS
ATTORNEY.

Patented Nov. 12, 1940

2,221,268

UNITED STATES PATENT OFFICE 2,221,268

AUTOMOTIVE VEHICLE SEAT

Russell N. Sears, Cortland, N. Y., assignor to Brockway Motor Company, Inc., Cortland, N. Y., a corporation of New York Application October 15, 1938, Serial No. 235,118

6 Claims. (Cl. 155—14)

The present invention relates to improved means for effectively adjusting automobile, truck and the like vehicle seats, and has particular reference to a bodily shiftable resilient framework or rigidly mounted stanchion means arranged to mount relatively inclinable seat and back members that may be manipulatively adjusted to facilitate finding a comfortable posture on part of characteristically different drivers and of otherwise allowing an unfettered manipulation of the motor control pedals or the steering wheel.

Long haul truck or the like operators frequently desire a change in posture to promote ease of driving or to counteract fatigue after sitting in a fixed position for a protracted time period. Accordingly, my seat and back panel members are hingedly connected at their adjacent edges and pivotally suspended in a novel manner within the confines of a suitable framework or the like stanchion means. Said framework as a whole may be slidably mounted upon complementary tracks and rendered shiftable toward or away from the steering wheel or foot pedals by adjustable link means without requiring alteration in the set adjustment between the respective seat members. All such manipulative controls are located within convenient reach of the seat occupant. In addition, the level of the forward seat edge may be independently raised or lowered to suit individual preference, the aforesaid seat edge being purposely kept freely separable from its upholding means to provide for such adjustment. The upper back panel region may herein be pivotally sustained by the transverse yoke component of my resilient framework or by rigid stanchion means, the rear edge of the seat panel being hingedly connected to a lower portion of the depending back panel.

The object of my improvements is to provide for an automotive seat assembly of the character indicated and one predicated upon the use of multiple universal adjustment features that shall be durable, ornamental in appearance, economical to fabricate and capable of affording the maximum of comfort to the seated driver.

Reference is had to the accompanying two sheets of drawings which are illustrative of a specific disclosure of my invention, and in which drawings:

Fig. 1 represents an elevational side view of a driver's seat for a motorized vehicle and which assembly is equipped with my improved adjusting devices.

Figs. 2 and 3 respectively illustrate a front and a rear view of the Fig. 1 disclosure, while Fig. 4 depicts a bottom view of my seat assembly.

Referring first in detail to my inherently yieldable stanchion embodiment, the numeral 10 generally comprises a tubular metal framework that may be bent up in one continuous piece in modernistic fashion to include a pair of horizontally disposed runner or foot rail components 11 and 12 which may be interconnected by a U-shaped yoke component 13. The respective depending yoke legs 14 and 15 may each be given an S-shaped configuration (see Fig. 1) that respectively include a vertical back supporting rail element such as 15A and a horizontal armlike rail element such as 15B having its forward end region shaped into a return bend portion such as 15C that integrally merges with a forward end portion of a corresponding foot rail to leave an overhanging laterally yieldable rear rail end portion, as shown. The medial yoke region lies transversely over the rear end region of said foot rails. It is preferred to reversely crimp inwardly the upper region of each return bend as indicated at 15D in Fig. 2 and thereby augment the lateral spacing of the rail elements 15A and 15B with respect to that of the foot rails 11 and 12. An inset tubular cross bar 18 or the like preferably spaces the forward region of the respective foot rails in planiform alignment therewith.

In addition, each rear terminal of said foot rails may be separately interconnected to the tubular yoke component 13 by one or more relatively thin brace struts such as 16. Said yoke may be slotted to fixedly receive the respective upper strut ends therein, while each apertured lower strut end may be doubled back upon itself to afford space for the reception of a transverse guide bolt 17. The rear end of each foot rail may be entered and welded into aligned apertures of a contiguous lower strut end as shown in Fig. 1, to constitute a laterally yieldable reenforcement between the yoke 13 and the respective foot rails 11 and 12. Said reenforcement may include the use of welded light weight cross braces such as 25.

The described tubular frame structure primarily affords a suitable pivotal suspension for my back panel. It is however within the scope of my invention to resort to an inherently rigid frame structure such as a partition wall of a vehicle body or the like. In the claim terminology, all such equivalent supports are intended to be embraced by the words "stanchion means."

The understructure for supporting my seat assembly may comprise a pair of angle iron tracks 19 and 20 of which the floor contacting flanges fixedly rest upon supporting boards (not shown), while the respective mated flanges are shown upturned in substantial parallelism. The rear end of each upturned flange may be longitudinally slotted as at 21 for the reception of the through guide bolt 17. The forward end of each upturned track edge may further be provided with a series of forwardly inclined notches such as 22 for the stepwise linear adjustment of the seat superstructure lengthwise of said tracks. A separate forked clasp 23 may be welded to fixedly embrace each forward end of the respective foot rails 11 and 12 to provide for depending forks that straddle a contiguous track flange, as shown. Said forks are bridged by an adjusting pin 24 arranged to selectively engage any one of the track notches. By slightly tilting the assembled framework 10 about the complementary guide bolts 17, said adjusting pins may readily be withdrawn and placed into a different notch. When shifting the driver's seat toward or away from the foot pedals (not shown), each slidable bolt 17 will be made to travel a corresponding distance along its track slot 21. Said bolts conjointly serve to pivotally retain the respective rear ends of the foot rails in aligned registry with their underlying tracks.

A bracket including an elongated bearing 26 may be alignedly secured by welding to each frame return bend 15C. Mounted therebetween, is a rotatable horizontal shaft 27 having a manipulative knob 28 at one end thereof. Adjacent to each inner end of said bearings, is installed an apertured cam plate 29 or the like eccentric device that is preferably given a polygonal or the like perimetric cam profile and whose aperture is purposely offset eccentrically with respect to the axial center of such configuration in the manner detailed in Fig. 1. Such cam profile preferably comprises a progression of relatively inclined or intersecting faces that are tangentially disposed at stepped distances about the shaft axis.

The upper edge of a rectangular back panel 30 including its upholstery 30A, may be tiltably suspended from and wholly sustained by the transverse yoke component 13 by means of complementary hinge straps such as 31. Each such strap may be longitudinally slotted at 31A and bolted in place to permit of adjustably raising or lowering the attached back with respect to its pivotal suspension. The lower transverse edge of the back panel is pivotally adjoined at 32 to the rear edge of the substantially rectangular seat panel 33 which mounts the usual upholstery 33A thereon. The perimetric contour of such seat panel may be slightly tapered, as shown.

Affixed beneath the forward portion of the seat panel in cooperative relation with the respective cam plates 29, are a pair of elongated sheet metal guides such as 35, that may each be equipped with spaced depending bifurcations disposed to slidably straddle the respective side faces of a contiguous cam plate, as shown. Said guides also serve to steady the seat panel against side sway.

A slotted prop 36 may be fixedly erected intermediate the ends of the foot spacer bar 18 and which prop in the lower region of its slot is equipped with a bridging stop pin 37. Entered through said slot is a retractible link 38 whose forward lower edge is provided with a series of indentations such as 39 adapted to selectively engage the stop pin. The rear end of said link may be fixedly carried upon one end of an L-shaped link adjusting rod 40 and which rod may be rotatably mounted between angular brackets such as 41 to provide for a forwardly projecting rod end 40A by which the centralized link 38 may be manipulatively raised against the tension of the return spring 42. Said rod is carried by the seat panel and the axial rod center placed in adjacency with that of the hinge pintle 32, thus permitting the cam plate 29 to change the height of the forward seat edge without disturbing the link adjustment as fixed by any suitable stop pin such as 37. It is also pointed out that the link adjusting rod 40 and the shaft 27 are respectively disposed in parallelism adjacent to the forward and the rear seat edges to conjointly effect a combination of seat adjustments. By virtue of my link 38, the upheld seat panel may be bodily shifted lengthwise of the guides 35 without having to manually lift the forward seat edge away from the shaft 27.

Having described the structural aspects of my seat embodiment, the underlying mode of adjustment thereof may be traced as follows:

An outstanding contribution primarily lies in the universal adjustment features that the present embodiment affords, particularly as applied to motor driven vehicle purposes. The slotted adjustment of the straps 31 allows the rear seat edge to be raised or lowered to suit drivers of different stature. Thereupon, the front seat edge may be independently adjusted, all without requiring any change in the tilt between the back panel and its supporting stanchion means.

By rotating the knob 28, a corresponding but different perimetric flat portion of the respective aligned cams will serve to raise or lower the forward seat edge stepwise about its pivotal back connection 32. It will be obvious that a single cam will serve a like purpose. When adjustably set, the cam corner regions restrain and substantially latch said knob against inadvertent rotation. Furthermore, the downward seat inclination with respect to its back is limited by bringing the radially innermost cam edges into engagement with their respective guides 35. In all such adjustments, the suspended back as propped by the stanchion means 10, will assume a definite position that is fixed by the adjustment given to the link 38. After the knob 28 has set the front seat region to a preferred height, a lifting of said link through its manipulative end 40A, independently allows the engaged edges of the cam plates 29 to shift lengthwise of their respective guides 35 until a selected inclination between the seat and back panels shall have been achieved, whereupon a release of said rod end permits the stop pin 37 to automatically find engagement with a nearest link indentation 39.

In addition, provision is made to bodily shift my adjusted frame assembly lengthwise of the track understructure so as to bring the yoke component 13 toward or away from the control pedals or steering wheel. Such further shift may readily be accomplished by liftingly grasping a portion of the armlike rail element 15B and thereby locate a different position for the respective clasp pins 24 without having to disengage the respective guide bolts 17. The cross bar 18 is arranged so as not to interfere with either of my duplex seat adjustments.

It will be observed that the seat panel 33 when loaded, imposes a downward pull upon the back suspension straps 31 which in turn is counteracted by a thrust exerted along the columnlike brace struts 16. While such reenforcements partially restrict the downward resiliency on part of my tubular frame yoke 13 toward the underlying tracks, it still permits the back panel to freely spring rearwardly to an appreciable extent. My interposed tie struts are of a character that do not materially restrict the seat resiliency inherent in said tubular framework except in a downward direction and thus allow the back upholstery to comfortably accommodate itself to a desired posture on part of the seat occupant.

As will be understood by those skilled in this art, the disclosed adjustable seat assembly may find application to purposes other than automotive seats and that various modifications in the details or disposition thereof may be resorted to in likewise carrying out my illustrative embodiment, all without departing from the spirit and scope of my invention heretofore described and more particularly defined in the appended claims.

I claim:

1. In a universally adjustable automotive seat assembly provided with pivotally jointed seat and back panels of which the back panel is suspended by stanchion means and which seat panel extends forwardly from the pivot joint thereof, elongated guide means affixed to and crosswise beneath the forward extending portion of the seat panel, a manipulative link of which one end region is pivoted beneath said panel in a rearward relation to the guide means and the other link end region is adjustably lockable with respect to the stanchion means, and manipulatively adjustable upholding means carried by the stanchion means to include rotatable eccentric means upon which the guide means slidably rests, said guide means for a change in adjustment of the upholding means being arranged to unobstructedly lift away from or descend toward the eccentric means while said link remains locked, said link when unlocked allowing the guide means to be selectively shifted lengthwise of the upholding means by a corresponding endwise movement of said link irrespective of the adjusted position of the upholding means.

2. In a unitary seat assembly, an inherently resilient framework comprising a pair of laterally spaced foot rail components that are integrally bridged by a U-shaped yoke component whose medial portion lies over the rear end regions of the respective foot rail components and is provided with complementary depending legs that respectively connect integrally to the forward end of a different foot rail component, laterally resilient strut means bracing said medial yoke portion and extending downwardly into fixed engagement with the respective rear end regions of the foot rail components, a back panel pivotally suspended from and wholly sustained by said yoke, a forwardly extended seat panel having a rear edge pivotally sustained by such suspended back panel, and manipulative upholding means carried by said framework serving to adjustably shift the forwardly extended seat panel portion toward or away from said foot rail components.

3. A seat assembly comprising stanchion means, a back panel having its upper region pivotally suspended from and sustained by said stanchion means, a substantially rectangular seat panel having its rear edge pivotally sustained by a lower region of the suspended back panel and extending forwardly therefrom, and adjustable upholding means for selectively raising or lowering the forward edge of the seat panel, said upholding means including a rotatable manipulative shaft arranged beneath the seat panel and equipped with cam means having a polygonal profile whose center is eccentrically disposed with respect to the shaft axis, said cam means being provided with a series of relatively inclined face components which when successively brought into flatwise engagement with a cooperating seat panel portion, respectively serve to restrain said shaft against inadvertent rotation.

4. A seat assembly comprising stanchion means, a back panel having its upper region pivotally suspended from and sustained by said stanchion means, a substantially rectangular seat panel having its rear edge pivotally sustained by a lower region of the suspended back panel and extending forwardly therefrom, guide means including complementary flanges depending beneath the forwardly extended portion of the seat panel, and adjustable upholding means including a rotatable manipulative shaft cooperatively arranged beneath said guide means to adjust the inclination of the seat panel with respect to the suspended back panel, said shaft being equipped with cam means having a series of relatively inclined face components upon which said guide means successively rests and the flanges of which guide means serve to steady the seat panel against side sway.

5. A seat assembly comprising stanchion means, a back panel having its upper region pivotally suspended from and sustained by said stanchion means, a substantially rectangular seat panel having its rear edge pivotally sustained by a lower region of the suspended back panel and extending forwardly therefrom, adjustable upholding means for the forward portion of said seat panel, stop pin means located beneath the forwardly extending portion of the seat panel, manipulative rod means pivotally mounted beneath the seat panel and interposed between said stop pin means and the rear edge of the seat panel, and a link of which one end is fixedly mounted upon the rod means and the other link end extends forwardly to swing into operative engagement with the stop pin means, said other link end being provided with a series of indentations that selectively engage such pin means.

6. In a universally adjustable automotive seat assembly provided with pivotally jointed seat and back panels of which the back panel is suspended by stanchion means and which seat panel extends forwardly from the pivot joint thereof, elongated guide means affixed to and crosswise beneath the forward extending portion of the seat panel, a manipulative link of which one end region is pivoted beneath said panel in a rearward relation to the guide means and the other link end is adjustably lockable with respect to the stanchion means, manipulative adjustable upholding means carried by the stanchion means to include rotatable eccentric means upon which the guide means slidably rests, said guide means for a change in adjustment of the upholding means being arranged to unobstructedly lift away from or descend toward the eccentric means while said link remains locked, and rail means underlying the stanchion means whereby the aforesaid adjusted seat assembly may be bodily shifted therealong.

RUSSELL N. SEARS.